United States Patent [19]
Ganzel

[11] Patent Number: 5,882,090
[45] Date of Patent: Mar. 16, 1999

[54] TRACTION CONTROL SYSTEM HAVING PILOT OPERATED VALVES

[75] Inventor: Blaise Joseph Ganzel, Ann Arbor, Mich.

[73] Assignee: Kelsey-Hayes Company, Livonia, Mich.

[21] Appl. No.: 504,299

[22] Filed: Jul. 20, 1995

[51] Int. Cl.⁶ ........................................................ B60T 8/34
[52] U.S. Cl. ..................................... 303/113.2; 303/113.4; 303/116.1; 303/119.1
[58] Field of Search .............................. 303/113.2, 113.4, 303/116.1, 119.1; 364/426.01–426.03

[56] References Cited

U.S. PATENT DOCUMENTS

| 4,750,788 | 6/1988 | Seibert et al. | 303/113.2 |
| 5,209,552 | 5/1993 | Reinartz et al. | 303/116.1 X |
| 5,299,858 | 4/1994 | Beck | 303/113.2 |

*Primary Examiner*—Peter M. Poon
*Attorney, Agent, or Firm*—MacMillan, Sobanski & Todd

[57] ABSTRACT

A hydraulic braking system providing anti-lock braking ("ABS") and traction control ("TC") incorporates a normally closed pilot-operated traction control switching valve to permit brake pressure in the driven wheel greater than master cylinder pressure. A dual flow return path can be used during brake release. The system also uses a normally open pilot-operated supply valve between the pump inlet and the master cylinder.

24 Claims, 5 Drawing Sheets

TRACTION CONTROL SYSTEM HAVING PILOT OPERATED VALVES

TECHNICAL FIELD

This invention relates to traction control systems as integrated into vehicle braking systems, and including particular control valve assemblies used in such systems.

BACKGROUND ART

Three modifications are commonly made to conventional anti-lock braking ("ABS") systems in order to integrate a traction control ("TC") function, namely, (i) the pump must be restructured so as to be a self-priming pump, (ii) provision must be made for providing fluid to the pump inlet, i.e. a "priming" valve, and (iii) providing the means of closing the circuit so that the pump can build pressure at the driven wheel brake higher than that originating from the master cylinder, a function normally provided by a "switching" valve. At least one of these valves, the switching valve, has heretofore been designed as a solenoid controlled or actuated valve. In the conventional split brake system then, this would require two solenoid actuated valves, i.e. one for each side of the brake system.

SUMMARY OF THE INVENTION

The invention contemplates elimination of the conventional solenoid actuated switching valve by incorporation of a normally closed pilot-operated valve, thereby reducing the overall size of the ABS/TC housing reducing the complexity of the system, eliminating the electronics associated with the control of two extra solenoids, and reducing expense.

The invention also contemplates a uniquely and efficiently constructed normally closed pilot-operated switching valve for use in the above-described system.

The invention further contemplates a uniquely and efficiently constructed normally open pilot-operated pump inlet supply valve.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is an elevation view in cross-section of a normally open pilot operated pump supply valve in accordance with the present invention and showing the end closure member as taken along section lines 4—4 of FIG. 4a;

BEST MODES FOR CARRYING OUT THE INVENTION

Figure 1:
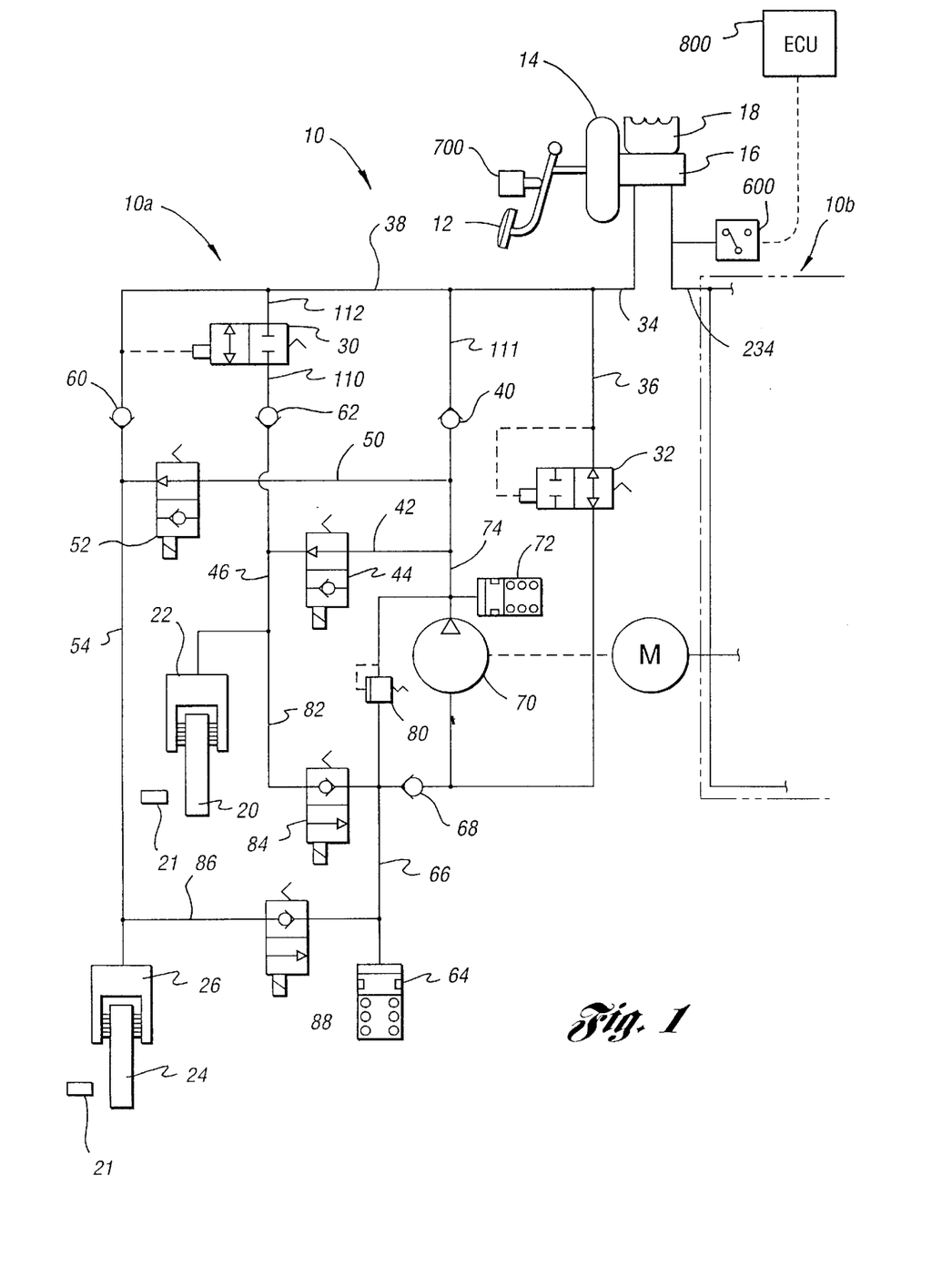
FIG. 1 is a schematic view of one-half of a diagonal split, pedal isolated type vehicular braking system including an ABS/TC unit in accordance with the present invention.

In FIG. 1, there is shown a schematic of the hydraulic circuit, generally designated by numeral 10, and components in the circuit for an anti-lock brake system coupled with traction assist constituting an integrated electrical/hydraulic control unit ("HCU").

As a general description, the system implements the functions of anti-lock braking and traction control in an integrated hydraulic circuit. This system may be referred to as an 8-valve, pedal isolated system.

The actuation of the ABS and TC systems includes use of an electronic control unit ("ECU") which responds to signals indicative of wheel speed under dynamic operating conditions.

The traction control feature is complementary to the anti-lock brake feature. Upon application of the brake pedal, the hydraulic circuit transitions from (a) the traction control-available mode, into (b) the braking mode in which the brakes may be applied through either (i) normal manual actuation, or (ii) ABS-controlled actuation.

The changeover between states (i.e. ABS versus TC) of the hydraulic circuit involves the use of pilot valves which shift in response to hydraulic pressure changes associated with brake pedal application.

In a closed system, the pump draws hydraulic fluid for traction control from the master cylinder reservoir through the same line which supplies fluid pressure for the normal braking function.

In detail, as seen in FIG. 1, brake pedal 12 is coupled to a master cylinder 16 through a vacuum booster unit 14. A brake position switch 700 is located near the brake pedal to indicate when the brake pedal has been depressed and when the pedal has returned to its unactuated position. The master cylinder is of the tandem chamber type with an associated fluid reservoir 18, and it supplies brake fluid to a pair of wheel rakes 20 and 24.

Only one-half of the system is shown, designated 10a, and in this case the brake 20 is on the driven wheel (e.g. a front wheel) and the brake 24 is on the opposite non-driven (rear) wheel. The non-illustrated remaining one-half of the brake system, designated 10b, is identical to that shown as applied to the remaining pair of wheels, and functions in the same manner as that illustrated.

Sensors 21 read the speed of the respective wheel relative to the brake, thus sensing a locking condition. In the case of sensor 21 on the driven wheel 20, a slip condition is also sensed. Intermediate the master cylinder 16 and wheel brakes 20, 24 is located the ABS/TC unit. Its components include a dual opposed piston, reciprocating piston-type pump 70 driven by a motor M. The one pump piston feeds the system segment shown, and the opposed piston (not shown) feeds the other one-half of the system. Also included is a high pressure accumulator 72, a low pressure accumulator 64, a pair of solenoid actuated, normally open isolation valves 44, 52, a pair of normally closed hold/dump valves 84, 88, a normally closed pilot operated switching valve 30, a normally open pilot-operated pump supply valve 32, a series of one-way check valves 40, 60, 62, 68 and a pressure relief valve 80. Optionally, check valve 68 could be eliminated. Also, isolation valve 44 and dump valve 84 could be combined into a single wheel brake fluid pressure control valve assembly.

NORMAL BRAKING OPERATION

During normal braking, upon application of the brake pedal 12, hydraulic pressure is transmitted from the master cylinder through line 34, which divides into lines 36 and 38. The hydraulic pressure in line 36 actuates the pilot-controlled valve 32. The hydraulic pressure in line 38 actuates the pilot-controlled valve 30. Valves 30 and 32 are each two-port, two-state hydraulic valves with venting to atmospheric pressure through a third port. The normal (or unactuated) state of valve 30 is closed (i.e. non-flowing). The normal (or unactuated) state of valve 32 is open (i.e. flow-ing). The valve 32 responds to a hydraulic pressure increase in line 36 by closing. The valve 30 responds to the increase in hydraulic pressure in line 38 by opening. A preferred set point for each valve to change state is 85 p.s.i.g.

The hydraulic pressure increase in line 38 is transmitted through check valve 40 and divides into lines 42 and 50. Line 42 continues in a flow path to the driven wheel 20. Line 50 continues in a flow path to the non-driven wheel 24.

The hydraulic pressure in line 42 passes through a normally-open, solenoid actuated valve 44. Similarly, the hydraulic pressure signal in line 50 passes through a normally open, solenoid-actuated valve 52. Each of the valves 44 and 52 is a two-port, two-state valve.

The hydraulic pressure in line 42 continues through solenoid valve 44 into line 46 to the cylinder 35 on the brake 22 of the driven wheel 20. Similarly, the hydraulic pressure passes in line 50 through the solenoid valve 52 then continues through line 54 to the cylinder on the brake 26 of the non-driven wheel 24.

In summary, during normal braking operation, (1) the pilot valves 30 and 32 are actuated to open and closed states, respectively, and (2) the open states of the solenoid-actuated valves 44 and 52 is maintained.

On brake release, and until line pressure from the wheel brake cylinders 22, 26 in lines 50 and 54, respectively, drops below 85 p.s.i.g., the released brake fluid from driven wheel 20 will flow to the master cylinder through dual paths, namely (i) through line 46 directly through check valve 62 and now open (actuated) switching valve 30 to line 38 and (ii) through (non-actuated) isolation valve 44, through line 50, open (non-actuated) isolation valve 52 provided for the non-driven wheel, and then through lines 54 and 38, successively. Below 85 p.s.i.g., as switching valve 30 shuttles to its normally closed position, driven wheel brake release continues only through open isolation valve 52. The brake release for non-driven wheel 24 is always through lines 54, 38 to master cylinder 16.

ABS BRAKING OPERATION

The ABS mode becomes operative when the system senses one of the wheels having a rotational speed lower than that normally associated with the vehicle speed while the brake pedal is applied, i.e. a lock-up condition. A signal indicative of this condition is applied to the electronic control unit to trigger ABS override of the manual braking pressure applied by the vehicle operator.

a. ABS Dump Mode

In the ABS dump mode, the hydraulic pressure in the cylinders of the wheel brakes is relieved to abate braking action. This requires actuation of solenoid actuated dump valves 84, 88 to create a flow path from the wheel brake cylinders 22 and 26 to the low-pressure accumulator 64.

The pilot valves 30 and 32 remain in their actuated states (open and closed, respectively). Also, the solenoid valves 44 and 52 continue in their actuated states (both closed). The pump 70 is driven by the motor M, but the blockage of the flow paths to the wheel brake cylinders (due to closing of solenoids 44 and 52) causes the pump outlet to continue to bypass through the pressure relief valve 80 and return to the pump inlet in a closed-loop fashion.

The actuation of solenoid valves 84 and 88 opens a flow path from the wheels to the low-pressure accumulator 64. Each of the valves 84 and 88 is a solenoid actuated, two-port, two-state valve. The normal (or unactuated) state of valves 84 and 88 is closed to flow from the wheel brake cylinder. However, upon actuation, these valves open and create a path to the low-pressure accumulator 64. The path from the wheel brake cylinder 22 is through line 82, valve 84 and line 66. The path from the wheel brake cylinder 26 is through line 86 and valve 88.

b. ABS Hold Mode

In the ABS hold mode, the valves 30 and 32 continue in their actuated states (open and closed, respectively).

The ABS hold mode is implemented by the programmable logic unit through actuation of the solenoid actuated isolation valves 44 and 52. Each of these valves, upon energization of the solenoid, transitions from an open state to a closed state to interrupt the flow path for hydraulic fluid to the wheel brake cylinders 22 and 26 from the master cylinder.

The closure of valves 44 and 52 results in a pressure build-up at the outlet of pump 70 and charges the high pressure accumulator 72. When the pressure at the pump outlet exceeds a predetermined value, the pressure-limiting valve 80 opens to create a closed loop return path between the outlet and inlet of the pump 70.

By this valving arrangement, the ABS hold mode is obtained.

c. Brake Apply Mode

In the ABS brake apply mode, the valves 30 and 32 remain actuated (due to continuing application of the brake pedal 12). The motor M continues to drive pump 70. The inlet side of the pump draws fluid from the low-pressure accumulator 64 through line 66 and check valve 68. The outlet side of the pump 70 supplies pressurized fluid to the wheel brake cylinder 22 of the driven wheel 20 through a flow path defined by line 74, line 42, valve 44 and line 46. The flow path to the wheel brake cylinder 26 of non-driven wheel 24 is through line 74, line 50, valve 52 and line 54. The high-pressure accumulator 72 at the outlet of the pump 70 discharges immediately to line 74 to provide high pressure fluid flow at a rate not available from the pump alone.

THE TRACTION CONTROL MODE

The traction control mode is operative when one of the driven wheels experiences rotation at a speed indicative of slippage, i.e., greater than the vehicle speed. This condition is detected by wheel speed sensor 21 which supplies a signal to the electronic control unit. Wheel slippage may occur when the driver is attempting to accelerate the vehicle on a low traction surface, e.g., an ice patch.

The traction control is achieved by selectively applying braking pressure to the driven wheel(s) to reduce its rotation velocity to enhance traction between the tire and the road surface. The non-driven wheel is not acted on by braking forces in the traction control mode. The traction control mode is complementary to the ABS control mode. Therefore, the pilot-actuated valves 30 and 32 are in opposite states. Specifically, the valve 30 is in its normal (or unactuated) closed state, and the valve 32 is in its normally open state.

When the valve 32 is normally open (i.e., no application of the brake pedal 12 or application at a significantly low force incapable of building pressure to 85 p.s.i.g.), the master cylinder 16 (and its reservoir 18) is connected through line 36 to the inlet of the pump 70. This allows pump 70 to draw hydraulic fluid from the reservoir 18 of the master cylinder 16. The closing of valve 32 (i.e., upon normal application of the brake pedal 12) interrupts this fluid supply path to the pump 70.

The valve 30 is normally closed in the traction control mode (assuming no brake pedal pressure) and line 38 is isolated from the branched lines 42 and 50 leading to the wheel brake cylinders 22 and 26, respectively, due to check valve 40.

a. Traction Control Apply Mode

In the traction control apply mode, the solenoid valve 52 is actuated to its closed (one-way) state. This isolates the outlet of the pump 70 from the line 54 leading to the wheel brake cylinder 26 of the non-driven wheel 24. Valve 52 will remain closed throughout all traction control modes.

The outlet of the pump 70 is communicated to the wheel brake cylinder 22 of driven wheel 20 through normally open solenoid valve 44. The flow path from the outlet of the pump 70 comprises line 74, line 42, valve 44 and line 46. The return path is interrupted by the normally closed (one-way) solenoid valve 84.

The high pressure accumulator 72 provides a ready source of pressurized fluid following the first (TC) brake apply pulse. The accumulator 72 maximizes the response time for traction control, i.e., minimizing the time required for the system to bring up the pressure at the driven wheel brake.

In summary, the traction control apply mode is attained by actuating valve 52 to its closed state. All other valves in this one-half of the circuit are in their unactuated states.

b. Traction Control Hold Mode

In the traction control hold mode, the solenoid valve 44 is actuated to isolate the outlet of the pump 70 from the wheel brake cylinder 22 of the driven wheel 20. Also, solenoid actuated isolation valve 52 continues to be actuated to isolate wheel brake 26 of the non-driven wheel 24. This isolation of both brakes from the outlet of the pump causes the setting of the pressure-relief valve to be exceeded, and the output of the pump to flow through the pressure relief valve 80 and return to the pump inlet.

c. Traction Control Dump Mode

In the traction control dump mode, the hydraulic pressure at the cylinder of wheel brake 22 is relieved to decrease the braking force on the driven wheel 20. The pressure relief is accomplished by opening a return path to the reservoir 18 of the master cylinder 16.

The flow path from the wheel cylinder to the reservoir is open upon actuation of solenoid actuated dump valve 84. The flow path comprises line 82, dump valve 84, check valve 68, valve 32, line 36 and line 34.

The output of the pump 70 continues to cycle in a closed-loop manner due to the continued closure of solenoid actuated isolation valves 44 and 52, which isolate the wheel brakes 22 and 26, respectively.

Thus, the hydraulic circuit realizes the functions of both anti-lock braking and traction control in a closed system. The transition between the ABS and TC functions is implemented by a companion pair of pilot-actuated, two-port, two-state valves. The pilot pressure required to transition the valves between states is controlled by application of the brake pedal.

This results in a simpler and less costly system than other types of ABS/TC closed systems which use solenoid actuation of selector valves under supervision of a electronic control unit to transition between the ABS and TC modes. Nevertheless, it will be recognized that the use of such a system, particularly the pilot-operated switching valve 30, for all practical purposes is limited to diagonally split braking systems whereby during brake release a supplemental fluid flow return path, returning fluid from the brake cylinder 22 to the master cylinder is provided through the non-driven wheel isolation valve. This supplements the fluid flow return through the pilot-operated switching valve 30 during any brake release mode at master cylinder pressures above 85 p.s.i.g. and provides the sole fluid flow return path to the master cylinder when the normally closed pilot-operated switching valve 30 shuttles from its open position to its closed position as the line pressure falls below the valve's actuation pressure, namely below 85 p.s.i.g. in the example discussed herein.

The normally closed pilot-operated valve 30 may be replaced with a conventional normally open, solenoid operated valve. This circuit is called a 10-valve, pedal isolated system. An electronic control unit can be used to operate the solenoid valve so that the 10-valve system will function the same as the 8-valve, pedal isolated system discussed above. Specifically, during brake apply and release and all ABS modes, the solenoid valve will remain in its unactuated, open position. During all traction control modes, the solenoid valve will be actuated to its closed position.

All other valves in the 10-valve, pedal isolated system will be located in the same positions and perform in the same manner as those valves in the 8-valve, pedal isolated system discussed above.

As noted above, use of a check valve 68 between the pump 70 and low pressure accumulator 64 is optional. Without it, the 8-valve or 10-valve system functions in the same manner but allows the possibility that a prolonged significantly low force application of the brake pedal 14 can result in filling the low pressure accumulator 64.

Figure 2:
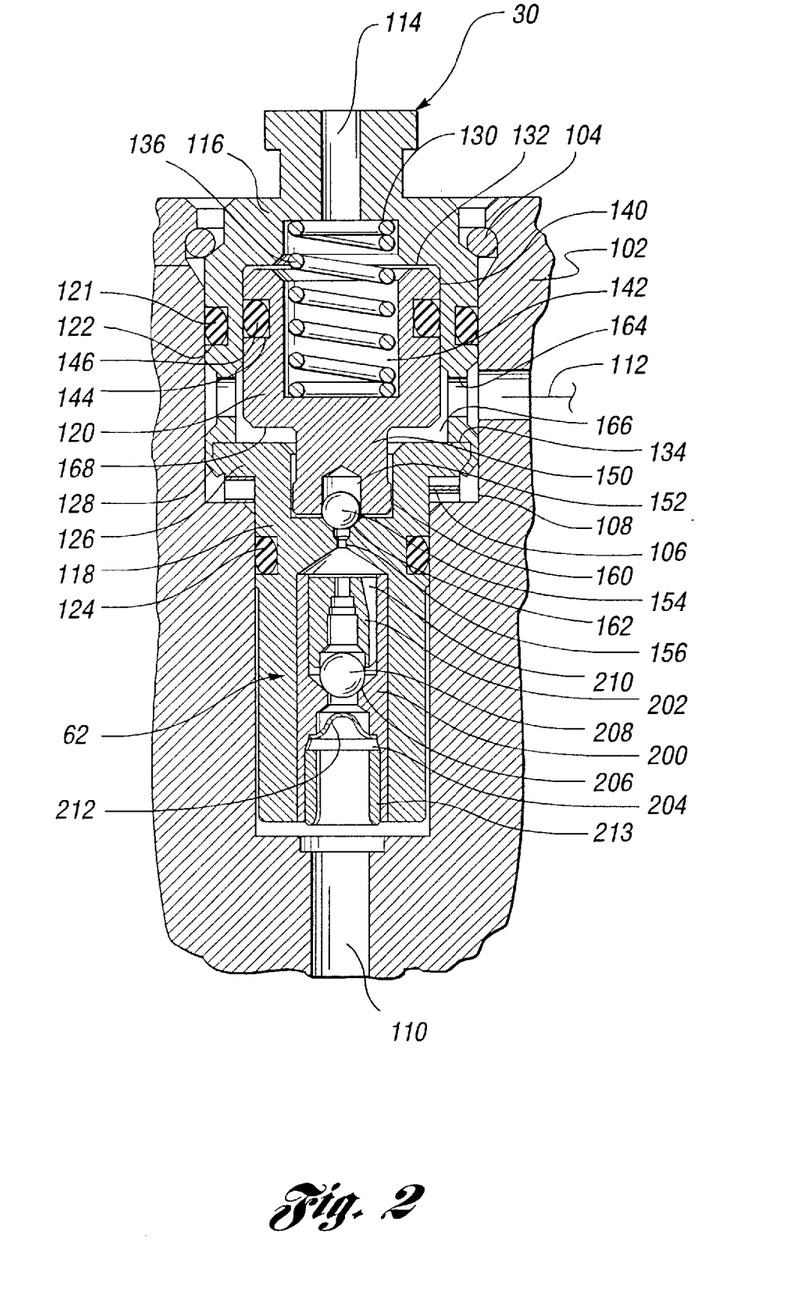
FIG. 2 is an elevation view in cross-section of a normally closed pilot-operated switching valve in accordance with the present invention for use with the pedal isolated hydraulic circuit of FIG. 1.

As shown in FIG. 2, the normally closed pilot-operated switching valve comprises a cartridge assembly, generally designated 30, retained in the housing 102 by means of outwardly biased snap ring 104 holding the cartridge axially against the force of wave spring 106 positioned within housing counterbore 108.

Feeding into the counterbore are hydraulic lines 110, 112, placing the valve in direct fluid communication with the driven wheel brake cylinder 22 and master cylinder 16, respectively. At the opposite end of the cartridge there is provided a fluid passage 114 in communication with atmospheric pressure.

Cartridge 30 comprises two basic components, namely, a two-piece valve body comprising an upper body portion 116 and a lower body portion 118, and a linearly moveable piston 120 located primarily within the upper body portion 116 and concentrically and axially aligned therewith. Upper body portion 116 is sealed relative to the counterbore by means of an O-ring 121 located within an annular groove 122 within the upper body portion 116.

Lower body portion 118 is sealed relative to the housing counterbore 108 in the same manner by means of O-ring 124. Lower body portion 118 is cylindrical and includes an annular collar 126 extending radially outward from one end thereof. The upper body member 116 is also cylindrical and basically cup-shaped with one end thereof receiving the annular collar 126 of the lower member 118 and being swaged over the annular collar as shown at 128 as a final assembly step to thereby provide retention at this juncture having a self-contained linearly moveable piston-type ball valve within the cartridge, as described below, and with the upper and lower members being axially fixed relative to one another.

Upper member 116 includes a plurality of concentric counterbores, each providing a shoulder 130, 132, 134. Shoulder 130 provides a chamber and stop for receiving a compression-type coil return spring 136. One counterbore 140 defines a piston cylinder for receiving cylindrical piston 120. The piston includes a counterbore 142 having a predetermined depth less than its total length to provide a chamber and seat for receiving return spring 136. Piston bore 142 and the adjacent upper sleeve counterbore are preferably the same diameter, that being only slightly greater than the diameter of the coil spring to thereby minimize any radial play. In the annular outer wall of the piston 120, there is provided an annular groove 144 for receiving an O-ring 146 for retaining a fluid tight seal between the reciprocating piston 120 and the upper body member 116.

At the other end of the piston, there is an annular axially extending stem 150 of reduced diameter having a concentric counterbore 152 of fixed depth sufficient in diameter to receive a sealing ball 154. The ball 154 is press-fitted within counterbore 152.

Lower member 118 includes a concentric throughbore defining a flow passage connecting to line 110 and including an orifice 156. The throughbore is counterbored at both ends of the lower member so as to provide a first counterbore communicating with housing fluid passage 110, and a second counterbore defining a chamber 160 for receiving in loose sliding relation the stem 150 of the piston 120. At the juncture of the throughbore with the counterbore, there is a spherical valve seat 162.

The cartridge assembly components as above-described are sized such that the compression return spring 136 holds ball valve 154 on its seat 162 to provide a normally closed pilot valve which will shuttle open.

Upper body member 116 further includes a fluid port 164 communicating on one side with the housing fluid passage 112 and communicating on the other side, namely its inner wall, with the fluid chamber 166 defined by a predetermined radial clearance between the outer annular wall of the piston and the inner annular wall of the upper body portion 116, which, as shown, is provided by means of reducing the outer wall cross-sectional thickness from both sides of the upper body member at a point between the O-ring seal 121 and the swage joint 128.

In operation, fluid pressure from line 112 will be exerted on the cross-sectional area of the annular land 168 of the piston, thereby forcing the piston against the force of the return spring and lifting the ball 154 from its valve seat when the fluid pressure from line 112 is sufficient to overcome the force of return spring 136.

Valve 30 further includes a check valve assembly generally designated 62. This piloted valve is acceptable for use only in the type of hydraulic circuit as shown in FIG. 1 whereby there is to be a check valve 62 in the system. Advantages of the piloted valve as shown in FIG. 2 are many including (i) the check valve may be incorporated within the pilot valve structure itself, as shown, thereby assisting manufacture and assembly and (ii) there is minimal opportunity for air entrapment since any fluid chamber and brake line between the two check balls 154 and 208 have virtually been eliminated, thereby enhancing the evacuate and fill bleed procedure.

The check valve 62 includes a pair of concentrically arranged sleeve members, namely an outer sleeve 200 and an inner sleeve 202. The outer sleeve includes a throughbore 204 which includes a valve seat 206 at one end. The inner sleeve is press-fitted within the outer sleeve and includes a ball valve 208 in axial free floating clearance relation within a throughbore within the inner sleeve. The inner sleeve further includes a flow passage 210 in open fluid communication with orifice 156 to provide free unidirectional flow from line 110 and to the driven brake line 112 and the master cylinder. A fluid filter 212 is provided at one end of the outer sleeve. A cylindrical expansion sleeve 213 is forced fitted into the end of outer sleeve 200 to press-fit it within the throughbore of lower body portion 118.

Fluid flow from line 110 will lift ball valve 208 to the fully opened position. On the other hand, differentially greater fluid pressure from line 112 will cause ball valve 208 to close on valve seat 206 to preclude all flow past the check valve 62, i.e. to line 110, or in other words, through the normally closed pilot valve 30.

Figure 3:
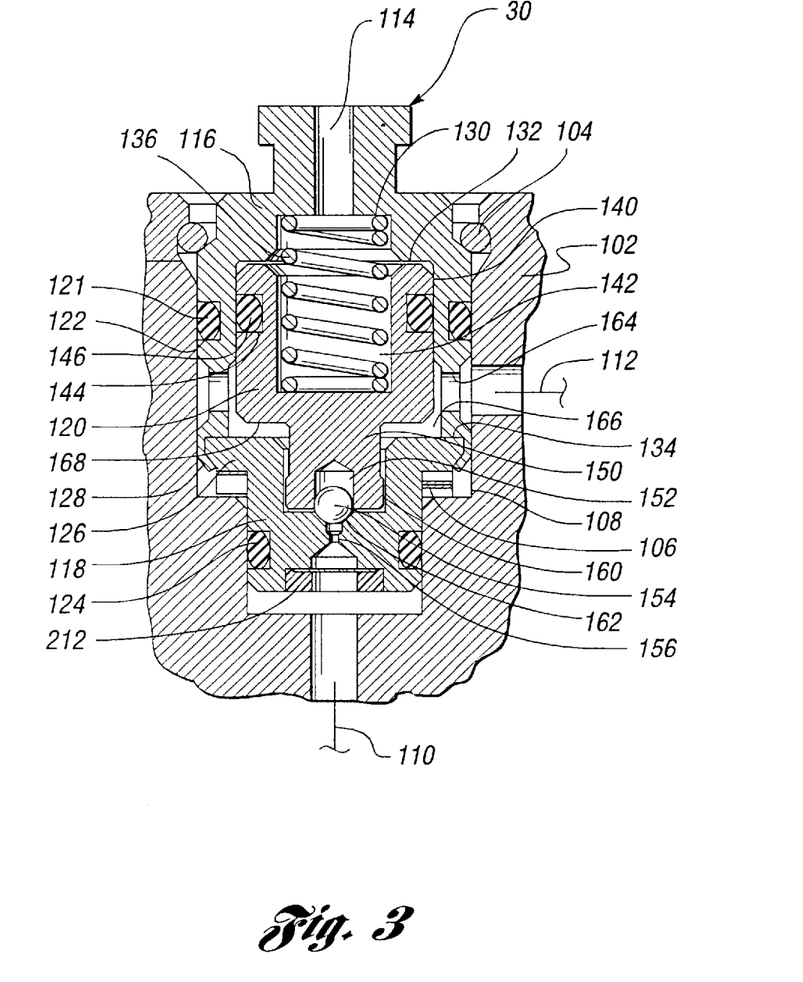
FIG. 3 is a view similar to FIG. 3 of an alternative embodiment of a normally closed pilot-operated switching valve in accordance with the present invention for use with the pedal non-isolated hydraulic circuits of FIGS. 5 and 6.

An alternative embodiment for a normally closed piloted valve 30 is shown in FIG. 3 and does not include the check valve assembly 62 described above in connection with the switching valve of FIG. 2. In all other respects, it is the same as that of FIG. 2.

The normally closed pilot-operated switching valve as above-described in connection with FIG. 3 may be used in the hydraulic circuit of FIG. 5.

The TC supply valve 32 which is used in the system of FIG. 1 (and the alternate system of FIG. 5) between the master cylinder 16 and the pump inlet is a normally open pilot-operated valve. During traction control, this valve remains open to allow the pump to pull fluid from the master cylinder 16 via the supply line 36. During normal braking and ABS, when the brakes are applied, this valve closes when the master cylinder generates approximately 85 p.s.i. (5.8 Atm), thereby preventing fluid flow in the supply line 36.

Figure 4:
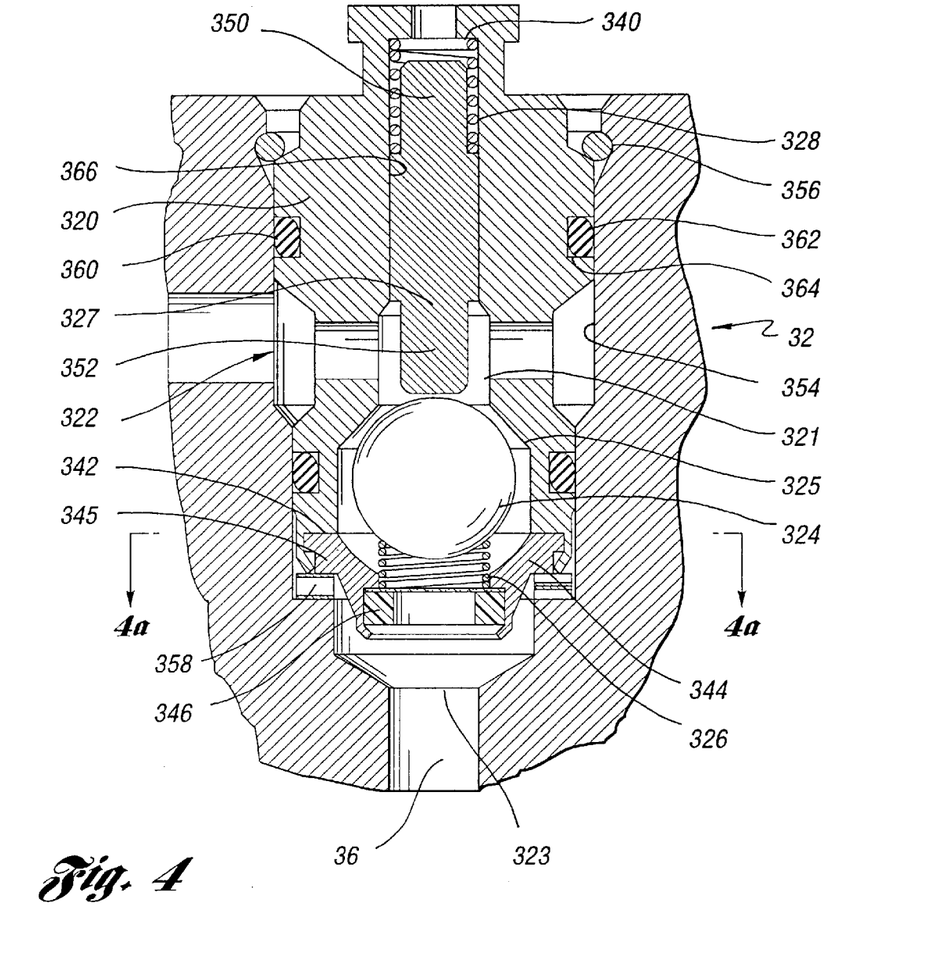

A cross sectional view of the specific valve design is shown in FIG. 4. It comprises a cylindrical sleeve 320 having an inner chamber 321, a first port 322 connected to the pump inlet, a second port 323 connected to the master cylinder and a valve seat 325. A check ball 324 is biased towards the valve seat 325 by a first spring 326. A piston 327 is located in the inner chamber 321 and is biased towards the check ball 324 by a second spring 328. Second spring 328 exerts a greater force against piston 327 than the force first spring 326 exerts against check ball 324. Therefore, piston 327 keeps check ball 324 away from valve seat 325 and the valve remains normally open for fluid flow in either direction between the first and second port.

When the fluid pressure on piston 327 reaches approximately 85 p.s.i.g. (5.8 Atm) the piston moves upward and the first spring 326 urges ball 324 to seat against valve seat 325, thereby closing the valve. This fluid pressure can reach the piston 327 through the second port 323 (connected to the master cylinder) by flowing around the unseated check ball 324, or through the first port 322 (connected to the pump inlet). When the valve is closed, the seated ball 324 will prevent fluid flow from the second port 323 (master cylinder) to the first port 322 (pump inlet), but fluid can flow in the opposite direction through flow channels 329 in the end closure member to port 323 as long as it provides enough pressure to overcome the force of the first spring 326.

During traction control dump mode as described regarding the FIG. 1 system, pressurized fluid is released from the driven wheel brake cylinders 22 and flows back to the master cylinder via the supply valve 32. Upon TC Dump, the low pressure accumulator 64 momentarily begins to fill at a set point of 20 p.s.i.g. which reduces the pressure of the fluid flowing into the first port 322 of valve 32 below the 85 p.s.i.g. (5.8 Atm) needed to move piston 327 and close valve 32. Instead, the fluid flows through valve 32 and returns to the master cylinder. The low pressure accumulator 64 then discharges its fluid which also flows back to the master cylinder via valve 32.

When the brakes are applied, the master cylinder generates enough pressure at the second port 323 of the supply valve 32 to move piston 327 and close the valve. This pressure then pushes upward on seated ball 324 keeping valve 32 closed. Since the ball 324 has a larger area than the piston 327, less pressure is required to maintain the valve closed then to initially close the valve. In particular, the valve 32 is kept closed until the pressure against the seated ball at the second port 323 drops to approximately 50 p.s.i. (3.4 Atm). Thus the valve 32 operates with hysteresis.

Figure 4A:
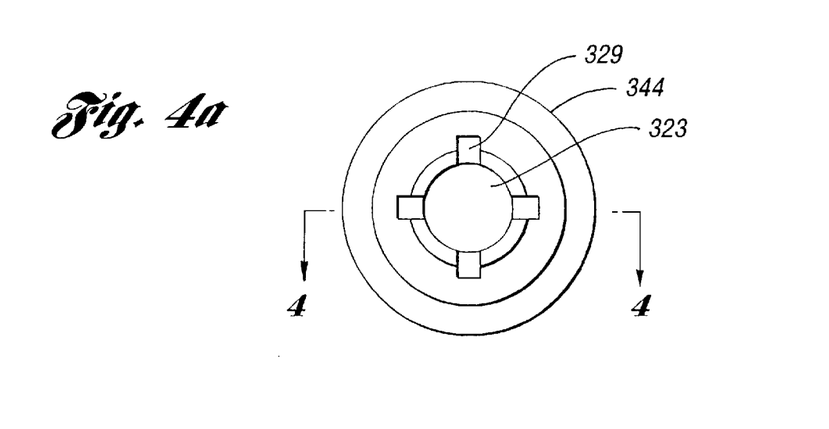
FIG. 4a is a plan view of the end closure member as taken along section line 4a—4a of FIG. 4.

Further details of the supply valve 32 according to the embodiment of FIG. 4 are as follows. Sleeve 320 has a concentric throughbore, counterbored at several locations to provide a stop shoulder 340 for piston return spring 328, the valve seat 325, and a further stop shoulder 342 for locating an end closure member 344. Within the throughbore there is located the piston return spring 328, the piston 327, check ball 324, ball return spring 326, and end closure member 344 which may or may not include a filter 346, all arranged in successive order as shown. The closure member includes one or more flow channels 329 appearing as equally spaced radial slots about the bore and ball seat of closure member 344 as shown in FIG. 4a. The closure member is crimped at 345 by the valve housing. The piston includes reduced diameter end portions 350, 352 which are identical in length and diameter so that the pin may be inserted from either end as a manufacturing convenience. The piston return spring is seated on the adjacent pin end portion 350. The valve is located within the hydraulic control unit, seated within a bore 354 and retained by means of a snap ring 356 held within a retaining channel of the HCU. A wave spring 358 is located at the end of the bore such that upon inserting the switching valve within the bore of the HCU, the spring 358 may be loaded by pushing the valve past the snap ring, and thereafter the wave spring will maintain the valve in compression against the retaining snap ring. Valve 32 is provided with an inlet port 323 in direct fluid communication with the fluid line 36 from the master cylinder 16. Further, outlet port 322 is in direct fluid communication with the pump inlet. Sleeve 320 is sealed against the HCU by means of O-rings 360 compression loaded to the known requirements for a static seal. In the embodiment shown in FIG. 4, the piston 327 also includes an O-ring 362 seated within an annular groove 364 and being loaded in compression relative to the adjacent cylinder wall 366 of the valve casing so as to load the seal consistent with design characteristics for a static seal. These design characteristics in a preferred embodiment include loading the seal to approximately 20–30% compression, preferably 28–30% i.e the O-ring seal diameter for seal 362 in its uncompressed state being about 0.07 inches and being reduced in compression to a minor axis of about 0.05 inches. This degree of loading of the seal appears to considerably enhance the sealing characteristics of the piston. The high friction force created by this high degree of compression loading is overcome by the load of the return spring.

A unique feature of this design is the major diameter of the piston is limited in size to the minimum diameter of the valve seat. This assures that the volume of fluid required to shuttle the valve is maintained at an absolute minimum thereby enhancing the performance of the system.

In another embodiment (not shown) the piston O-ring seal 362 may be seated within the adjacent cylinder wall of the valve casing thereby allowing that the piston pin intermediate its end sections may be maintained at one consistent outer diameter throughout that portion of its length. No further modifications are necessary in the valve design to accommodate this design modification.

A further embodiment of the switching valve would be to eliminate the valve casing altogether, keeping the same internal components, but utilizing a bore of the HCU as the valve casing. Thus, the HCU would be bored to include a valve seat 325 accommodating the check ball 324, and a cylinder wall to accommodate the piston 327, return springs 326, 328 and filter.

Figure 5:
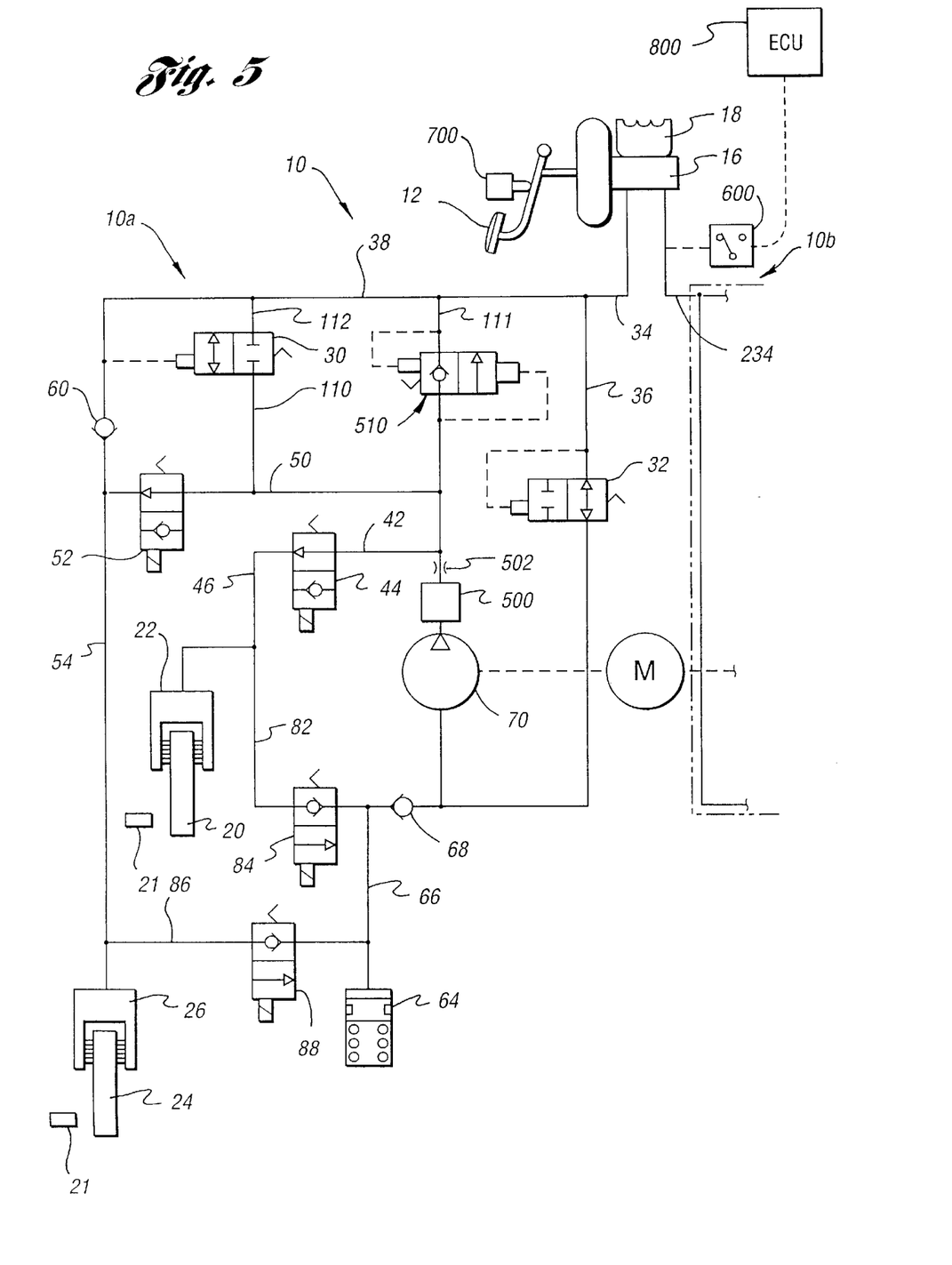
FIG. 5 is a schematic view similar to FIG. 1 and showing a second embodiment of a braking system in accordance with the present invention.

An alternate embodiment of the hydraulic circuit shown in FIG. 5 is similar to that shown in FIG. 1 with the exception that the circuit does not include a check valve 62 nor line 110 leading from valve 30 to the junction of lines 42 and 46. Rather line 110 is junctured with line 50. This is referred to as an eight valve, pedal non-isolated system. Also, the high pressure relief valve and high pressure accumulator of the system shown in FIG. 1 are replaced by an attenuator 500 having an orifice 502 and a differential pressure type pilot-operated, 2-way relief valve 510. As noted above, check valve 68 is optional.

In operation then, the circuit of FIG. 5 would differ from that shown in FIG. 1 by the following:

On normal brake apply, pressure is applied through line 38 to both lines 110 and 111 (through check valve 40), then through common line 50 and to both wheels brake cylinders 22, 26 through respective lines 46 and 54.

Brake release operates identically to that described relative to FIG. 1, excepting all released fluid from the brake cylinder 22 of the driven wheel 20 must pass through the open (unactuated) isolation valve 44 to line 50 before branching into the afore-described dual paths.

In ABS in all modes, since line 110 joins line 50 and check valve 62 has been eliminated, the ABS pump pressure pulses will be transmitted to the master cylinder and then to the brake pedal to alert the operator to the fact that the brakes are in the ABS mode. During ABS hold, pressurized fluid can flow from the pump outlet through line 50 to line 110, through the open actuated switching valve 30, through line 38 and back to the master cylinder 16. During ABS dump mode, solenoid valves 84 and 88 are actuated to open a path from the wheels to the low pressure accumulator 64 as stated above for the embodiment shown in FIG. 1. Additionally, fluid can flow from the pump outlet through line 50 to line 110, through valve 30 to line 38 and back to the master cylinder.

The traction control dump (and hold) mode of operation is different in that the pressurized fluid flows through line 111 and opens valve 510 flowing into line 38 and back into the supply line 36. Valve 510 is opened for flow in this direction when the pressure at the pump outlet reaches approximately 1200–1500 p.s.i.g. above the master cylinder pressure.

In addition to the brake position switch 700 described above, in all systems described there is also provided a second or supplemental brake switch 600. Only one switch 600 is required and it can be located in the main line 34, 234 of either half 10a, 10b of the system.

The supplemental brake switch 600 is a hydraulically actuated pressure switch and functions to signal the ECU 800 as to the status of the hydraulic brake circuit. The switch is actuated whenever the brakes are applied and the pressure in the main line 34, 234 exceeds a first predetermined pressure. When the brakes are applied during traction control the master cylinder pressure must be able to reach the wheel brakes for normal braking. This switch indicates that normal braking has begun and the wheel brakes should no longer remain isolated from the master cylinder. A first threshold pressure of approximately 125 p.s.i.g. is used for the systems disclosed, but a different actuation pressure can be used which fits the specific requirements of the system.

The brake pressure switch 600 returns to its unactuated state when the brake pressure falls below a second predetermined pressure. This second predetermined pressure can be the same pressure level as the first predetermined pressure or it can be different thereby forming a switching hysteresis. The second pressure threshold for the systems described above was chosen to be 85 p.s.i.g. which corresponds to the pressure at which the switching valve 30 closes. Thus, when the brake pressure switch 600 returns to its unactuated state, it indicates that the switching valve 30 has returned to its unactuated position and is now closed.

This feature is used to prevent brake "hang-up" which may be apparent when the driver stops applying the brakes during ABS but the vehicle still continues to decelerate. This may happen if the brake pedal takes time to return to its unactuated position and deactuate the brake position switch. Under these circumstances, the electronic control unit will not know that the brakes were released and will still remain in ABS mode.

During this time, the master cylinder pressure will decrease and switching valve 30 will close. With switching valve 30 closed, pump 70 running, and isolation valves 44 and 52 continuing to be shuttled for ABS operation, the fluid pressure at wheel brake cylinder 22 can increase above master cylinder pressure thereby applying the brakes.

The brake pressure switch can prevent brake "hang-up" by signaling the ECU 800 that the brake pedal was released when the master cylinder pressure falls below the second predetermined pressure. The ECU will cancel ABS mode and deactuate the isolation valves 44, 52. Any residual pressure at the wheel brake cylinder 22 can then be returned to the master cylinder via the unactuated open isolation valve 44, then 52, through check valve 60 and line 38. Although a second threshold of 85 p.s.i.g. is used, any pressure may be used which fits the specific requirements of the system.

While the best mode for carrying out the invention has been described in detail, those familiar with the art to which this invention relates will recognize various alternative designs and embodiments for practicing the invention. For example, pilot-operated switching valve 30 for each segment 10*a*, 10*b* of the hydraulic circuits shown in FIGS. 1 and 5 could be replaced with solenoid operated valves. Similarly, pilot-operated pump supply valve 32 could be replaced with a solenoid operated valve. Thus, the above described preferred embodiments are intended to be illustrative of the subject invention which may be modified within the scope of the following appended claims.

I claim:

1. A vehicle braking system including a master cylinder, a fluid pressure generating pump having an inlet and an outlet, said braking system comprising:
   a driven wheel and a non-driven wheel, each said driven and non-driven wheel including a respective driven and non-driven wheel brake cylinder;
   a driven wheel brake fluid pressure control valve assembly intermediate said driven wheel brake cylinder and said pump including a normally open solenoid actuated driven wheel isolation valve for supplying brake fluid (i) directly from said master cylinder or (ii) through said pump and further including a dump valve for evacuating brake fluid from the driven wheel cylinder; and
   a non-driven wheel brake fluid pressure control valve assembly intermediate said non-driven wheel brake cylinder and said pump including a normally open solenoid actuated driven wheel isolation valve for supplying brake fluid (i) directly from said master cylinder or (ii) through said pump, and further including a dump valve for evacuating brake fluid from the driven wheel cylinder, wherein said non-driven wheel isolation valve is closed throughout the traction control mode.

2. The braking system of claim 1 further including a normally open, pilot operated, supply valve intermediate said master cylinder and said pump.

3. The braking system of claim 2 further including a low pressure accumulator connected to said outlet side of said dump valves.

4. The braking system of claim 1 further including a switching valve having an inlet port and an outlet port, said outlet port being in fluid communication with said master cylinder, and said inlet port being in fluid communication with said driven wheel brake cylinder for allowing fluid flow from said driven wheel brake cylinder through said switching valve in its open position and back to said master cylinder.

5. The braking system of claim 4 wherein said inlet port is in fluid communication with said driven wheel brake cylinder, said inlet port being connected to a one-way check valve, whereby flow is permitted from the brake cylinder to the master cylinder but not from the master cylinder to the brake cylinder.

6. The braking system of claim 5 further including a second one-way check valve located between said master cylinder and said isolation valves and permitting flow in a direction only from said the master cylinder to the isolation valves, said second one-way check valve also being in fluid communication with the output side of said pump and precluding pressure pulses from said pump from being transmitted to said master cylinder.

7. The braking system of claim 6 further including a one way check valve in fluid communication with said pump inlet and intermediate said pump supply valve and said low pressure accumulator thereby precluding the filling of the low pressure accumulator except through the fluid being dumped from said wheel brake cylinders through said respective dump valves.

8. A vehicle braking system including two separate subsystems,
   the vehicle system being functional in an anti-lock brake operational mode and a traction control operational mode,
   said system including a master cylinder capable of providing each subsystem with brake fluid, a fluid pressure generating pump and a normally open, pilot operated, supply valve intermediate said master cylinder and said pump,
   one of said subsystems including a driven wheel having a respective wheel brake cylinder in fluid communication with a wheel brake fluid pressure control valve assemblies intermediate said driven wheel and said pump,
   each said subsystem further including a normally closed pilot-operated switching valve deactuated to a closed position at a first fluid pressure in said subsystem,
   said system further including an electronic control unit for providing control signals to said wheel brake fluid pressure control valve assembly and a pressure switch located between said master cylinder and said switching valve for sending fluid pressure information to said electronic control unit, and
   said pressure switch having a pressure responsive first position and second position such that said pressure switch switches from said second position to said first position at a pressure approximately equal to said first fluid pressure.

9. A vehicle braking system of the diagonally split type including a master cylinder, a fluid pressure generating pump and a normally open, pilot operated, supply valve intermediate said master cylinder and said pump, said braking system comprising:

a driven wheel and a non-driven wheel, each said driven and non-driven wheel including a respective driven and non-driven wheel brake cylinder;

a driven wheel brake fluid pressure control valve assembly intermediate said driven wheel brake cylinder and said pump including a normally closed solenoid actuated dump valve having an inlet side and an outlet side and being actuable to an open position for evacuating brake fluid from said driven wheel brake cylinder, and a normally open solenoid actuated isolation valve for supplying brake fluid (i) directly from said master cylinder or (ii) through said pump;

a non-driven wheel brake fluid pressure control valve assembly intermediate said non-driven wheel brake cylinder and said pump including a normally closed solenoid actuated dump valve having an inlet side and an outlet side and being actuable to an open position for evacuating brake fluid from said non-driven wheel brake cylinder, and a normally open solenoid actuated isolation valve for supplying brake fluid (i) directly from said master cylinder or (ii) through said pump;

a low pressure accumulator connected to said outlet side of said dump valves, a normally closed pilot-operated switching valve having an inlet port and an outlet port, said outlet port being in fluid communication with said master cylinder, and said inlet port being in fluid communication with said driven wheel brake cylinder for allowing fluid flow from said driven wheel brake cylinder through said switching valve in its actuated open position and back to said master cylinder; and said driven wheel brake cylinder further being in fluid communication with said master cylinder through said driven wheel brake fluid pressure control valve assembly and then through said non-driven wheel brake fluid pressure control valve assembly, whereby during the brake release portion of the normal braking mode, brake fluid being released from said driven wheel brake cylinder flows back towards the master cylinder through the dual paths of (i) through said actuated open switching valve and (ii) through said non-driven wheel brake fluid pressure control valve assembly.

10. The braking system of claim 9 wherein said pilot-operated switching valve is actuable to an open position at a line pressure of approximately 85 p.s.i.g.

11. The braking system of claim 10 wherein said inlet port is in fluid communication with said driven wheel brake cylinder, said inlet port being connected to a one-way check valve, whereby flow is permitted from the brake cylinder to the master cylinder but not from the master cylinder to the brake cylinder.

12. The braking system of claim 11 further including a second one-way check valve located between said master cylinder and said isolation valves and permitting flow in a direction only from said the master cylinder to the isolation valves, said second one-way check valve also being in fluid communication with the output side of said pump and precluding pressure pulses from said pump from being transmitted to said master cylinder.

13. The braking system of claim 12 wherein said normally closed pilot-operated switching valve having a third port venting to atmosphere is in fluid communication with said master cylinder.

14. The braking system of claim 9 further including a one way check valve on the input side of said pump and intermediate said pump supply valve and said low pressure accumulator thereby precluding the filling of the low pressure accumulator except through the fluid being dumped through said dump valves from the respective wheel brake cylinders.

15. The braking system of claim 9 wherein the inlet of said switching valve being connected to the inlet side of said isolation valve for the driven wheel intermediate said driven wheel isolation valve and said non-driven wheel isolation valve whereby during an ABS braking mode when the switching valve is in the actuated open position at brake pedal pressures above valve actuation pressure, the pressure pulses from the ABS mode will be fed back through said switching valve to said master cylinder.

16. The braking system of claim 15 further including a one way check valve on the input side of said pump and intermediate said pump supply valve and said low pressure accumulator thereby precluding the filling of said low pressure accumulator except through the fluid being dumped through said dump valves from the respective wheel brake cylinders.

17. The braking system of claim 16 further including a fluid line common to the outlet side of said pump, the inlet side of said isolation valves and said master cylinder, said common fluid line including a one-way check valve permitting free flow of fluid at any pressure from the master cylinder to the inlet side of said isolation valves, said check valve being a pressure differential operated switching valve whereby fluid flow from the outlet side of said pump towards said master cylinder is permitted only when the pressure on the pump side of said pressure differential operated switching valve exceeds pressure on the master cylinder side of said pressure differential operated switching valve by a predetermined pressure.

18. A vehicle braking system including a master cylinder, a fluid pressure generating pump having an inlet and an outlet, said braking system comprising:

a driven wheel and a non-driven wheel, each said driven and non-driven wheel including a respective driven and non-driven wheel brake cylinder;

a driven wheel brake fluid pressure control valve assembly intermediate said driven wheel brake cylinder and said pump;

a non-driven wheel brake fluid pressure control valve assembly intermediate said non-driven wheel brake cylinder and said pump;

a switching valve having an inlet port and an outlet port, said outlet port being in fluid communication with said master cylinder, and said inlet port being in fluid communication with said driven wheel brake cylinder for allowing fluid flow from said driven wheel brake cylinder through said switching valve in its open position and back to said master cylinder; and said driven wheel brake cylinder further being in fluid communication with said master cylinder through said driven wheel brake fluid pressure control valve assembly and then through said non-driven wheel brake fluid pressure control valve assembly, whereby during the brake release portion of the normal braking mode, brake fluid being released from said driven wheel brake cylinder flows back towards the master cylinder through the dual paths of (i) through said actuated open switching valve and (ii) through said non-driven wheel brake fluid pressure control valve assembly.

19. The braking system of claim 18 further including a normally open, pilot operated, supply valve intermediate said master cylinder and said pump.

20. The braking system of claim 19 wherein said driven and non-driven wheel brake fluid pressure control valve assemblies each include a respective normally open solenoid actuated isolation valve for supplying brake fluid (i) directly from said master cylinder or (ii) through said pump, and a respective normally closed solenoid actuated dump valve having an inlet side and an outlet side for evacuating brake fluid from said the respective wheel brake cylinder.

21. The braking system of claim 20 further including a low pressure accumulator connected to said outlet side of said dump valves.

22. The braking system of claim 21 wherein said inlet port is in fluid communication with said driven wheel brake cylinder, said inlet port being connected to a one-way check valve, whereby flow is permitted from the brake cylinder to the master cylinder but not from the master cylinder to the brake cylinder.

23. The braking system of claim 20 further including a second one-way check valve located between said master cylinder and said isolation valves and permitting flow in a direction only from said the master cylinder to the isolation valves, said second one-way check valve also being in fluid communication with the output side of said pump and precluding pressure pulses from said pump from being transmitted to said master cylinder.

24. The braking system of claim 21 further including a one way check valve in fluid communication with said pump inlet and intermediate said pump supply valve and said low pressure accumulator thereby precluding the filling of the low pressure accumulator except through the fluid being dumped from said wheel brake cylinders through said respective dump valves.

* * * * *